UNITED STATES PATENT OFFICE.

HENRY HICKS HURT, OF YONKERS, NEW YORK, ASSIGNOR TO ROBESON PROCESS COMPANY, OF NEW YORK, N. Y., A CORPORATION OF NEW JERSEY.

BURNING FUEL.

1,329,300.  Specification of Letters Patent.  Patented Jan. 27, 1920.

No Drawing.  Application filed May 11, 1918. Serial No. 233,925.

*To all whom it may concern:*

Be it known that I, HENRY HICKS HURT, a citizen of the United States, residing at Yonkers, in the county of Westchester and State of New York, have invented certain new and useful Improvements in Burning Fuel, of which the following is a specification.

This invention relates to processes of burning fuel; and it comprises a method of burning fine or dusty fuel, such as run-of-mine coal, coke breeze, fine coal, etc., wherein such fuel is sprinkled with sulfite waste liquor just prior to burning; all as more fully hereinafter set forth and as claimed.

In burning fine fuel on an ordinary grate the two main difficulties are dusting, in handling and in the furnace chamber, and the stoppage of draft.

It is a common expedient to wet down such coal with water prior to delivery to the furnace chamber; the effect of course being to agglomerate the dust particles into aggregates which are easier to handle. The bonding or clumping effect is due to the high surface tension of the water. In so wetting down the coal the advantage gained is mainly outside the furnace chamber in enabling more convenient handling since as soon as the coal becomes warm the water evaporates and the original dust re-forms. The wetting down does not help materially in the fire chamber, either in repressing flying dust or in keeping the fire bed open and pervious.

I have found that it is better to wet down the fine coal with an aqueous solution of some bonding material capable of charring. In so doing, the water exercises its surface tension effect in causing a clumping or bonding of the particles while as the water disappears by the warming of the coal in the fire chamber, first the bonding effect of the dissolved bodies develops and then that of the char formed in their carbonization. In other words with such a solution there is a bonding and dust repressing effect from first to last, the dissolved matter maintaining the clumps or aggregates formed by the first wetting. While many other watery solutions containing dissolved matters such as molasses and the like may be used in my invention I find that for a number of reasons the best material is a concentrated waste sulfite liquor, which may be advantageously the 30° Baume product now found on the market as a binder for cores and the like.

In the sulfite process of making wood pulp, the wood is digested under pressure with bisulfite of lime or bisulfite of lime and bisulfite of magnesia. Under the influence of the heat and pressure about half the wood goes into solution to form new organic bodies containing the elements of the original bisulfite while the residue of the wood remaining undissolved is the paper pulp or cellulose. For the sake of a name, the portion of the wood which goes into solution is known as lignone and the combinations it forms with the bisulfite of lime or magnesia are known as ligno sulfonate of lime or ligno sulfonate of magnesia. The liquor as it leaves the digester contains very little sulfurous acid or bisulfite as such. It is a material of quite sensitive character, readily decomposing with the re-formation of the original bisulfite; and it is difficult to concentrate it to form commercial products. On heating it the slight amount of sulfurous acid present catalyzes the formation of more sulfurous acid and decomposition becomes a self-accelerating phenomenon. By careful neutralizing the slight amount of acid present with the aid of lime and evaporating in vacuo at a low temperature (see Patent No. 833,634) useful concentrated commercial products may be made. It is a material of this character which I find most advantageous in the present invention. However sulfite liquor evaporated in other ways may be here employed though I do not regard it as being as advantageous as material concentrated in the described manner. In such material the original organic bodies of the sulfite waste liquor that is the ligno sulfonate of lime or ligno sulfonates of lime and magnesia are preserved substantially unchanged.

Concentrated waste sulfite liquor of 30° Baumé is a dark brown red viscous liquor containing about 50 per cent. of its weight of solid matter. Although sulfur occurs in the ligno-sulfonates present yet its actual amount in the liquor is very small. The material is an excellent bonding agent for many fine powders.

In the present invention I sprinkle the fuel which may be fine coal, run-of-mine coal, coke breeze, etc., with concentrated waste sulfite liquor. The liquor used may be the 30° Baumé material or such material diluted down with two or three times its volume of water. This depends largely upon the particular coal being treated. The amount used is merely that which will cause the fine fuel to clump up and assume a non-dusting, open or pervious character. The fuel so treated is fired in the furnace in the ordinary way. As the fuel becomes hot the water evaporates leaving the organic matters of the sulfite liquor and these matters maintain the bond between the fuel particles. As the heat further increases the organic matters char and the char now maintains the bond. In other words there is always a bonding agent present, this being at first the water, (or the water solution of organic solubles) later the organic solubles themselves and still later the char formed. The net result is that dusting in handling and within the furnace is prevented and the fuel mass is maintained open and pervious. There is no tendency on the part of the sulfite liquor solubles to fuse down and obviate the open structure of the clumped or agglomerated fuel.

Molasses may be used in much the same way but is not as good for the reason that as the water is driven off the sugars present tend to melt and destroy the open pervious texture given in the wetting or agglomerating. However with care molasses may be used to obtain some of the results secured with sulfite liquor. Other concentrated aqueous liquids containing dissolved organic matter, such as concentrated distillery slop, concentrated tanning liquor, waste yeast from breweries, etc., may be used in much the same way. But the concentrated sulfite liquor in addition to being a convenient, commercial, readily procured material displays great advantages in the present use over these other bonding agents.

What I claim is:—

1. The process of firing fine fuel which comprises wetting down said fine fuel with a concentrated aqueous solution of organic matters and charging the wetted down material on a fire bed.

2. The process of firing fine fuel which comprises wetting down fine fuel with an aqueous liquid comprising the characteristic solid matters of sulfite waste liquor and charging the wetted down material while still wet on a fire bed.

In testimony whereof, I affix my signature hereto.

HENRY HICKS HURT.

Witnesses:
ED J. KENNEY,
H. J. LEGGETT.